United States Patent
Andrews et al.

(10) Patent No.: US 12,351,079 B2
(45) Date of Patent: Jul. 8, 2025

(54) METHOD FOR OPERATING ELECTRICAL DRIVE UNITS OF SEAT COMPONENTS IN A MOTOR VEHICLE, PREFERABLY IN A PRE-CRASH CASE, AND SYSTEM FOR PERFORMING THE METHOD

(71) Applicant: Robert Bosch GmbH, Stuttgart (DE)

(72) Inventors: Bjoern Andrews, Karlsruhe (DE); Jens Schrader, Baden-Baden (DE); Jochen Moench, Sinzheim (DE); Juri Hartmann, Huegelsheim (DE); Rainer Berger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 17/602,462

(22) PCT Filed: Apr. 8, 2020

(86) PCT No.: PCT/EP2020/059985
§ 371 (c)(1),
(2) Date: Oct. 8, 2021

(87) PCT Pub. No.: WO2020/208061
PCT Pub. Date: Oct. 15, 2020

(65) Prior Publication Data
US 2022/0234475 A1        Jul. 28, 2022

(30) Foreign Application Priority Data

Apr. 10, 2019   (DE) .................... 10 2019 205 103.0

(51) Int. Cl.
*B60N 2/16*   (2006.01)
*B60N 2/02*   (2006.01)
(Continued)

(52) U.S. Cl.
CPC ....... *B60N 2/0276* (2013.01); *B60N 2/02246* (2023.08); *B60N 2/0252* (2013.01); *B60R 21/0134* (2013.01)

(58) Field of Classification Search
CPC .. B60N 2/0276; B60N 2/02246; B60N 2/002; B60N 2/0268; B60N 2/16; B60N 2/22;
(Continued)

(56) References Cited

U.S. PATENT DOCUMENTS 7,200,474 B2 * 4/2007 Motozawa ........... B60N 2/0276
                                                            701/45
2006/0001298 A1 * 1/2006 Tsuruta ................ B60N 2/0276
                                                            297/216.16
(Continued)

FOREIGN PATENT DOCUMENTS

CN    104029617 A  *  9/2014
CN    107215304 A     9/2017
(Continued)

OTHER PUBLICATIONS

Jakobsson et al., "WHIPS—Volvo's whiplash protection study", 2000, Accident Analysis & Prevention, 21, pp. 307-319 (Year: 2000).*

(Continued)

*Primary Examiner* — Jelani A Smith
*Assistant Examiner* — George A Alcorn, III
(74) *Attorney, Agent, or Firm* — Michael Best & Friedrich LLP

(57) ABSTRACT

A method for operating electrical drive units of seat components in a motor vehicle during a detected pre-crash situation. The method moves a passenger to a target position for an impending crash based on an actual position of the passenger. The method also determines a control strategy for coordinating an adjustment of the seat components in order (Continued)

to actuate at least two of the drive units simultaneously or immediately successively such that the required power of the drive units is minimized.

17 Claims, 4 Drawing Sheets

(51) Int. Cl.
*B60N 2/22* (2006.01)
*B60N 2/809* (2018.01)
*B60R 21/0134* (2006.01)

(58) Field of Classification Search
CPC ...... B60N 2/809; B60N 2/995; B60N 2/0252; B60R 21/0134; B60R 21/01552; B60L 1/003
USPC .......................................................... 701/45
See application file for complete search history.

(56) References Cited

U.S. PATENT DOCUMENTS

| | | | | |
|---|---|---|---|---|
| 2006/0220600 | A1* | 10/2006 | Greene | B60N 2/0276 318/126 |
| 2010/0066116 | A1* | 3/2010 | Coenen | B60R 22/1951 296/65.01 |
| 2011/0074190 | A1* | 3/2011 | Hashimoto | B60N 2/22 297/216.1 |
| 2015/0045984 | A1 | 2/2015 | Hui et al. | |
| 2016/0243964 | A1* | 8/2016 | Frommann | B60N 2/42736 |
| 2019/0016409 | A1* | 1/2019 | Tetsuka | B62K 25/08 |
| 2021/0268942 | A1* | 9/2021 | Chopra | B60N 2/501 |
| 2022/0048407 | A1* | 2/2022 | Ribero | B60N 2/4221 |

FOREIGN PATENT DOCUMENTS

| | | | |
|---|---|---|---|
| DE | 10309083 A1 | 9/2004 | |
| DE | 102004020049 A1 | 11/2005 | |
| DE | 102009027402 A1 | 1/2011 | |
| EP | 1893436 B1 * | 1/2013 | ........... B60N 2/0276 |
| JP | 2006008026 A | 1/2006 | |
| WO | 2006134417 A1 | 12/2006 | |

OTHER PUBLICATIONS

Translation of International Search Report for Application No. PCT/EP2020/059985 dated Jul. 21, 2020 (2 pages).

* cited by examiner

METHOD FOR OPERATING ELECTRICAL DRIVE UNITS OF SEAT COMPONENTS IN A MOTOR VEHICLE, PREFERABLY IN A PRE-CRASH CASE, AND SYSTEM FOR PERFORMING THE METHOD

BACKGROUND OF THE INVENTION

The invention concerns a method for operating electrical drive units of seat components in a motor vehicle, preferably in a pre-crash case, and a system for performing the method.

DE 103 09 083 A1 describes a device for rapid adjustment of a seat actuating drive which, on detection of an impending crash case, moves the backrest into a crash-optimized position by means of a high-speed mechanism. Furthermore, such a high-speed mechanism is used as an entry aid for adjusting an unloaded backrest.

If the flexibility of the vehicle seats increases further in future vehicle concepts because of autonomous driving, there is a danger that in a crash, the passengers will not be in a position optimized for the restraint systems and thereby the risk of injury will be increased. The seat adjustment drives known from the prior art are not however suitable for moving the seat components sufficiently quickly over great distances and angles within the short time period before a detected impending crash. The use of substantially more powerful actuator drives should however be avoided for reasons of weight and cost.

SUMMARY OF THE INVENTION

The method according to the invention for operating a drive unit of a vehicle component, preferably a side window, a sliding roof or seat components, and the drive unit for performing the method with the features of the independent claims, have in comparison the advantage that, by the use of a control strategy for the temporal sequence of various drive units of the different seat components, the maximum required power of the drives can be reduced. In this way, the drive units may be designed substantially smaller and lighter than if the individual drive units adjust the various seat components completely independently of one another. The idea is that firstly, the external acceleration of the vehicle may be used for coordination of the drive units, and secondly the dynamics of the one adjustment level may be used for actuation of another adjustment level. With this actuation concept, passengers in the motor vehicle can be moved within a very short time from a rest position into a seat position optimized for a crash case, so that the restraint systems—such as belt tensioners or airbags—can protect the passenger optimally in an impact accident. Because of the very rapid adjustment movement of the seat components, thereby for example passengers in the second seat row, or during autonomous driving from any arbitrary rest position, can be moved into the optimum target position for the impending crash.

The measures outlined in the dependent claims allow advantageous refinements and improvements of the embodiments defined in the independent claims. Determination of a control strategy for the different seat adjustment levels is preferably initiated by a sensor signal from pre-crash sensors. The time still available before the crash and also the acceleration forces acting on the vehicle in this period form the basis for establishing the control strategy. By using the sensors already present in the motor vehicle, no further additional sensors are required for determining the scenario until a possible crash.

The positional data of the seat components are determined continuously by the position detectors of the electrical drives, preferably by incrementally working Hall effect sensor systems or via sensorless systems which evaluate the current ripple of the adjustment motor.

To determine the control strategy, in addition to the current positional data of the seat components and/or the passenger, the individual key values of the passenger are also used. These individual key values of the passenger may for example be previously read into a memory, or be determined currently in the vehicle by means of suitable sensors. It is particularly preferable if the weight and body mass, in particular the body size of the passenger, can be used for developing the control strategy.

In order to reach the most optimum seat position for the impending crash during the time still available, also the maximum performance capacity of the individual drive units is taken into account for the control strategy. In addition, the current status of the energy available may be used for determining the control strategy.

For energy-saving in the adjustment movements, the dynamics of the individual adjustment levels of the seat components are taken into account. Thus in particular, the deceleration of a first adjustment movement may be used for acceleration of a seat component of a second adjustment movement. In this way, it may for example be useful not to begin different adjustment movements precisely simultaneously, but rather offset successively.

In order not to injure the passenger during the rapid adjustment movement in the pre-crash period, a maximum load on the individual body parts for a maximum acceleration is taken into account for the control strategy. For example, it is preferably ensured that the head or neck region is exposed to lower acceleration than other body parts. The maximum acceleration values for the individual body parts are determined for example in the pre-crash system and stored in a control unit for generating the control strategy.

The control strategy preferably actuates at least two different adjustment movements of different seat components, wherein for reaching an optimum target position in the case of a crash, the seat length setting and the seat slope setting and the backrest slope setting are regarded as the most relevant. Here, at least two of these adjustment levels, preferably all three adjustment levels, are matched to one another by the control strategy.

In addition, further adjustment levels, such as the seat height setting, the headrest height setting and the leg support length setting, may be taken into account. Here, the control strategy may comprise at least two of the complete seat adjustment levels or also three, four or more adjustment levels.

In order to reach the desired target position as quickly as possible, electrical drive units are preferably operated with a voltage which is substantially higher than usual 12 Volt vehicle network. Preferably, a voltage of around 24 Volt, 36 Volt, 48 Volt or 60 Volt is applied to the drive motors, so that for example all necessary seat components can be adjusted during a pre-crash period of around 0.1 to 0.3 seconds. During this period, the control strategy can achieve movements of the seat components of up to 20 cm in length adjustment or 15° in slope angle.

A particularly efficient control strategy results from coordination of the seat length setting with the backrest slope setting. Here, the inertia moment of the deceleration process of the seat length adjustment is used to reduce the energy requirement for erecting the backrest. For this, the drive of the seat backrest begins with a temporal offset from the drive of the seat length setting, so that in particular a maximum possible overlap of the deceleration process of the seat length adjustment with the backrest adjustment is used.

Another favorable control strategy consists of the advantageous matching of the seat slope setting with the backrest slope setting. Here preferably, on erection of the seat backrest, at the same time the seat slope is adjusted in the opposite direction.

For determining the control strategy, in addition to the interactions of the various adjustment levels, the external accelerations acting on the vehicle may be taken into account. In particular for an impending frontal impact accident, the initiated deceleration of the vehicle may be used for a more efficient backrest slope adjustment in which the passenger is erected accordingly for the crash case. The pre-crash sensors provide the expected acceleration values for derivation of the control strategy of the electrical drive.

In order to achieve as fast as possible an adjustment of the seat components in the pre-crash case, the electrical drives in particular have as high an efficiency as possible. For this, in particular, their gear mechanisms and bearings are configured such that they have the minimum possible self-inhibition. With such a design, it is necessary that the drive units then have a clamping lock which allows the seat components to be clamped in position on reaching the target position.

The system according to the invention for determining and performing the control strategy for adjusting the various seat components favorably uses the existing pre-crash sensors which detect any impending crash. Furthermore, the existing position sensors of the drive motors of the seat components are used for detecting the current position of the seat components. The system comprises a control unit into which the existing output data are read. In the control unit, the control strategy for actuation of the drive motors is determined on the basis of the time period still available before the crash and the current position of the seat components. In addition, data previously determined, such as specific characteristic key values of the passenger, e.g. size or weight, may be stored in the control unit. Also, the maximum performance capacity of the electrical drives may be stored in the control unit. The control strategy is derived from all these data, with the object of achieving the optimum position of the passenger in the predefined time period with the given electrical drives. It is ensured that the passenger is not exposed to any excessive acceleration and the electrical network of the vehicle is loaded as little as possible.

The invention is explained in more detail below with reference to examples without being restricted thereto.

DETAILED DESCRIPTION

Figure 1:
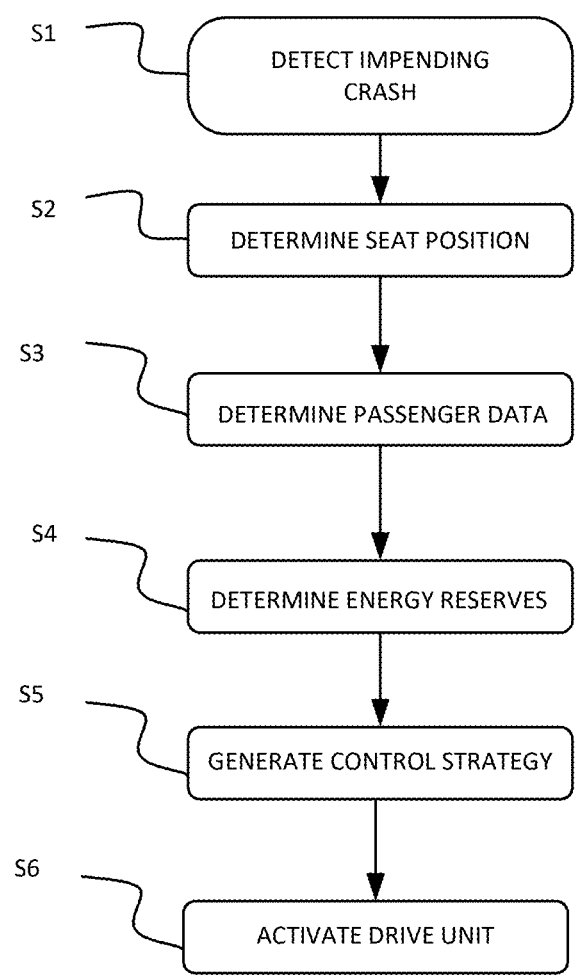
FIG. 1 schematically, the method steps for operating electrical drive units (10) of seat components in a motor vehicle in the case of a crash, FIG. 2a the temporal development of the power of the backrest adjustment, FIG. 2b the temporal development of the acceleration of the corresponding seat length adjustment, and FIG. 3 schematically displays the motor vehicle according to FIG. 1.

FIG. 1 depicts schematically for example a method for operating electrical drive units of seat components in a motor vehicle. In a first step S1, the pre-crash sensors detect the danger of an impending crash. The pre-crash sensors comprise acceleration and/or rotation rate sensors, but may also be combined with any other environmental sensors such as radar, ultrasound and video sensors. The pre-crash sensors supply the time period necessary for determining the control strategy for coordinating the adjustment of the seat components, and the accelerations acting on the vehicle during that time.

In a further step S2, the current position of the individual seat components is detected. Since the drive units each comprise a position detection for reaching predefined positions, their current values may be used for determining a control strategy.

In addition, according to a step S3, optional passenger-specific key data may be included which was either previously stored or is detected currently by corresponding interior sensors (e.g. camera, seat occupation sensor). For example, the weight and body mass of the passenger are made available for determining the control strategy.

Furthermore, in a step S4, the current energy reserves of the electrical drive units to be actuated, in particular the charge state of the battery or accumulator or supercapacitor, are detected. The structurally imposed maximum performance capacity of the individual electrical drives is also stored in the system for determination of the control strategy.

In a step S5, taking into account all these available input data, the optimum control strategy for actuating the electrical drive units of the seat components is generated. The aim of the control strategy is to reach an optimum seat position of the passenger for the specific crash case in the time still available. Because of the achieved determination of the optimum temporal sequence of the movements of the individual adjustment levels, the necessary maximum power and hence the installation size of the fitted electrical drives may be reduced. The control strategy in particular also takes into account the need to ensure that certain body parts, such as head and neck, are not exposed to excessive acceleration loads. The control strategy is determined in a processor of a control unit, preferably by means of implemented algorithms. The electrical drives are then actuated via the control unit.

In step S6, now the individual electrical drives of the different adjustment levels are actuated. According to the control strategy, the temporal sequence and power requirement of the drives are matched to one another such that a synergy effect of the various movements is utilized in order to lower the maximum power of the drives and the energy consumption. This control strategy also allows large adjustment travels and adjustment angles of the seat components within a short time, so that in the case of an impending crash, passengers can be moved in good time out of a comfort position, for example for autonomous driving, into a safe target position so that the restraint systems function optimally.

Figure 2A:
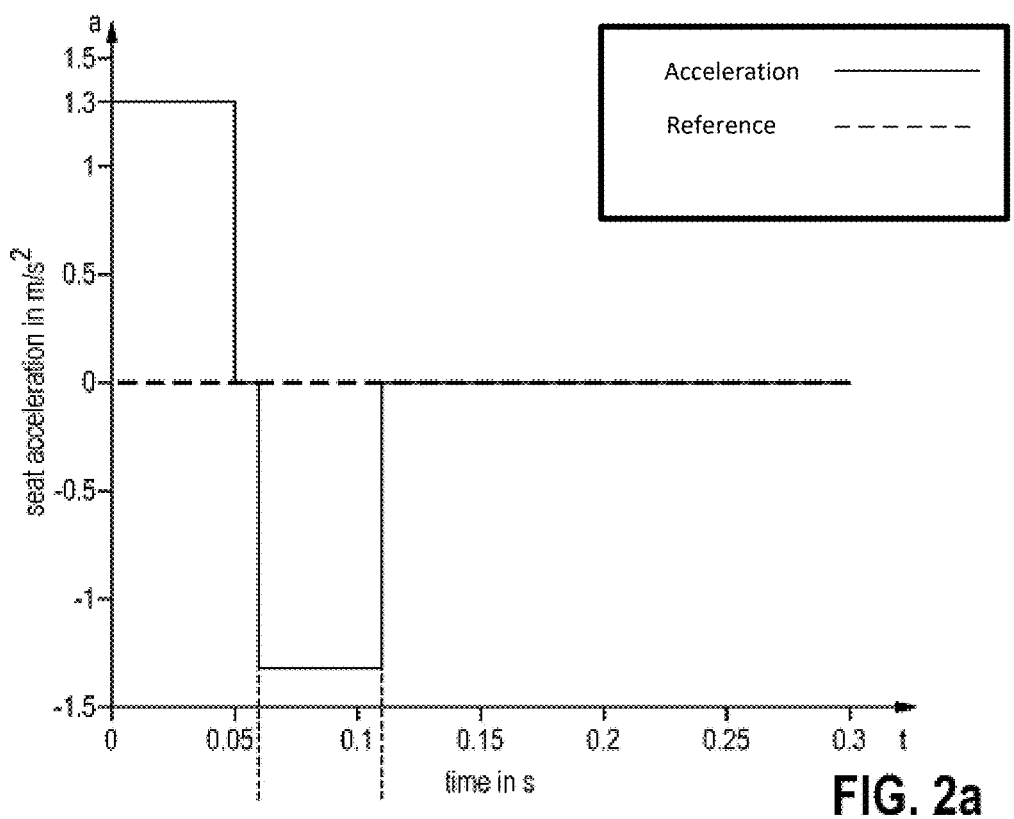
Figure 2B:
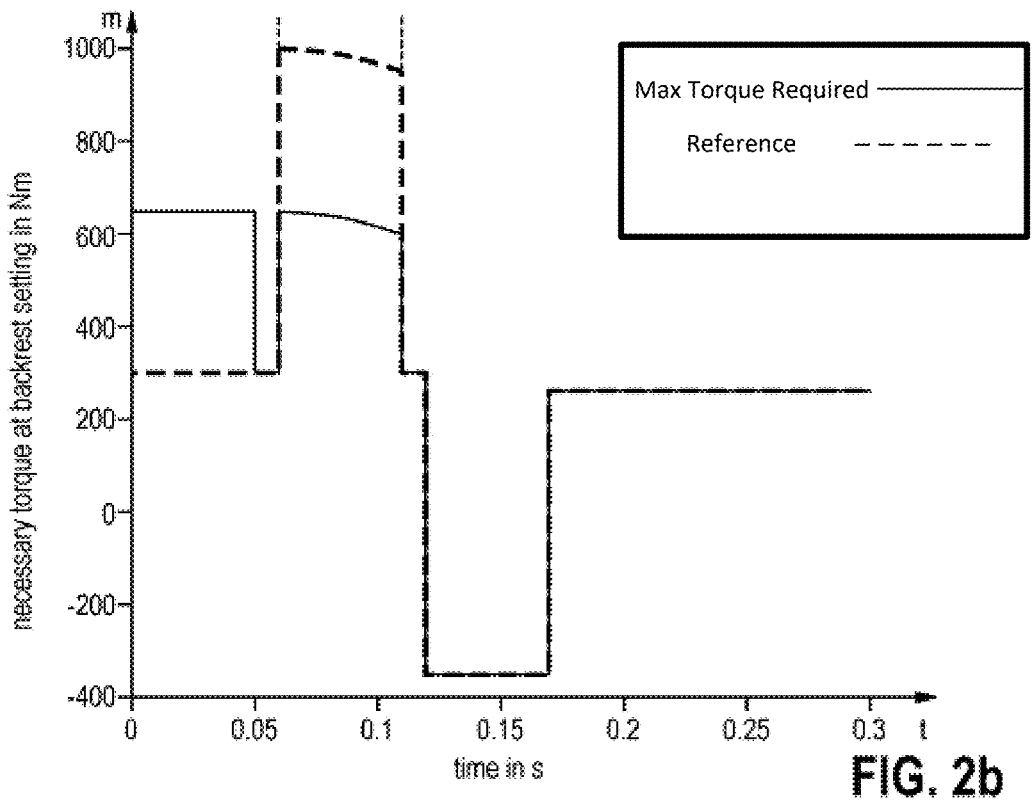
Figure 3:
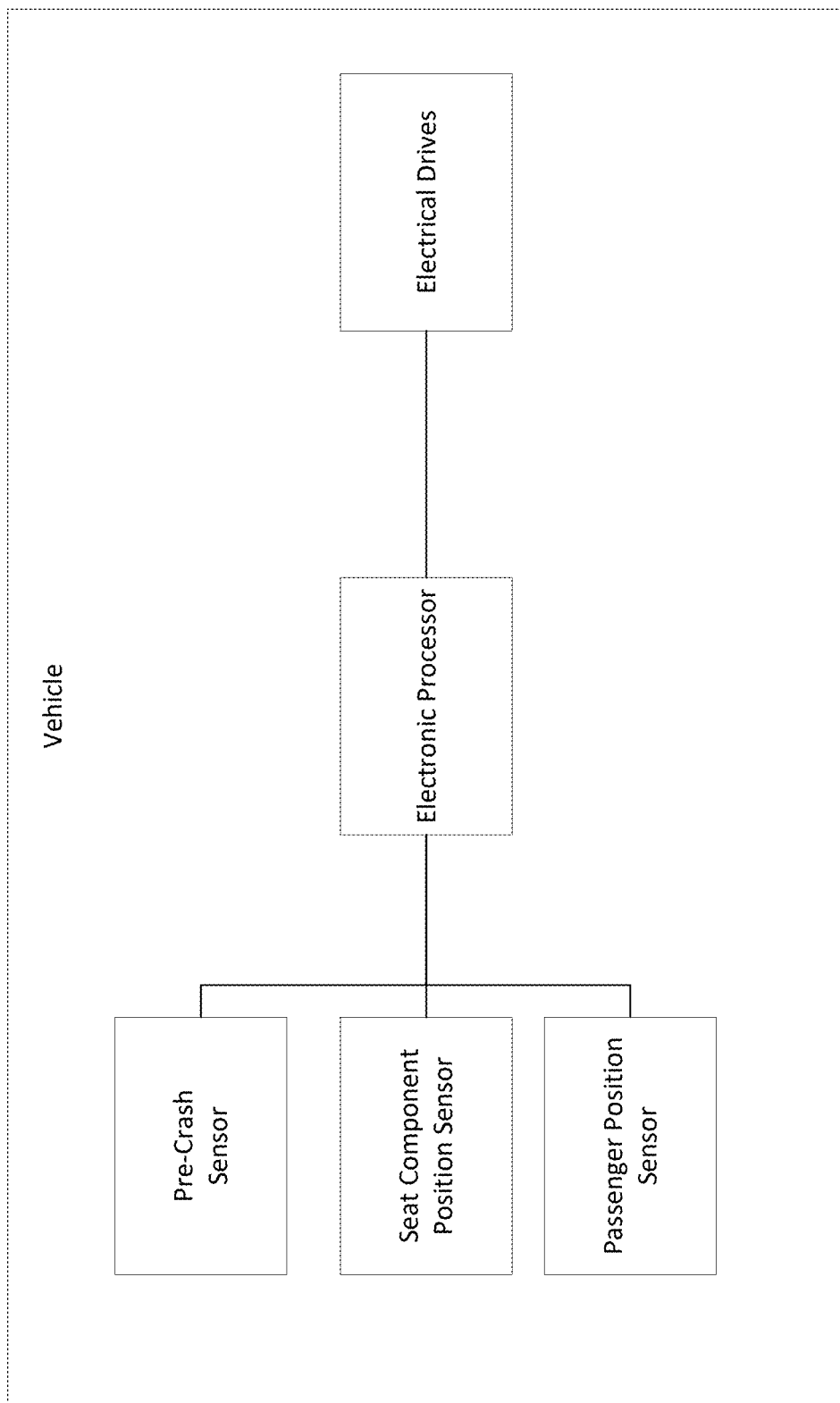
Figure 4:
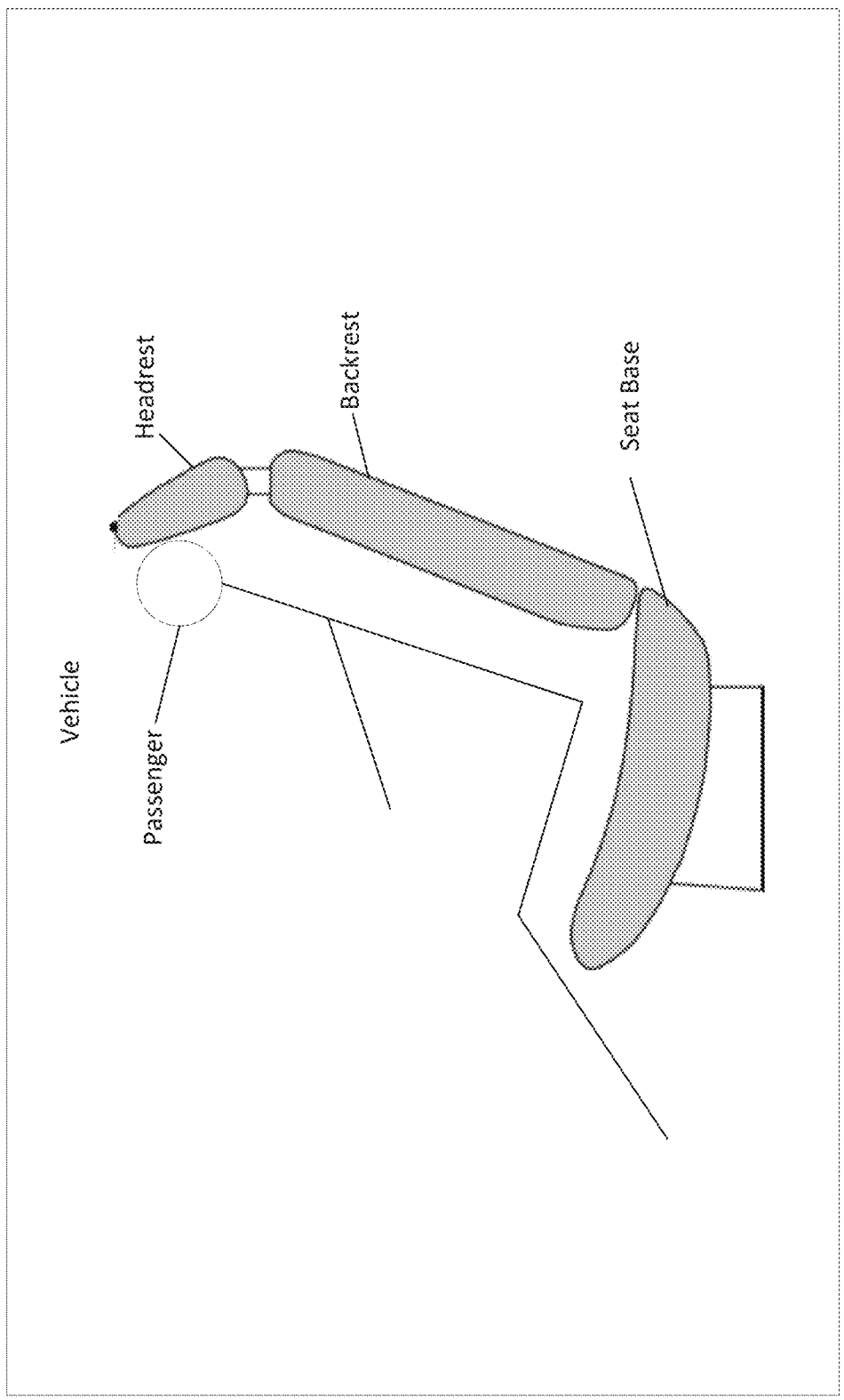
FIG. 4 schematically displays a seat of the motor vehicle according to FIG. 1.

As an example of a control strategy, the coordination of the adjustment levels of the backrest slope setting with the seat length setting is shown in the diagrams of FIGS. 2a and 2b. FIG. 2a shows the acceleration a of the adjustment movement of the seat length setting over the time t which begins immediately after detection of a pre-crash case at time t=0. The entire seat with passenger is accelerated in the direction of travel at for example 1.3 m/s$^2$. As a reference line, a dotted line at a=0 m/s$^2$ indicates the case without seat length adjustment.

FIG. 2b shows the necessary power as the necessary torque m in the hinge joint of the backrest setting over the time t. In the case that the seat length adjustment is not actuated, a maximum torque for backrest adjustment of around 1000 Nm is required, which is shown as a dotted line. The drive of the backrest setting begins only at 0.06 s, therefore the drive must apply a retaining moment of approximately 300 Nm for the backrest if the seat is not accelerated in the longitudinal direction.

In the case that the seat length setting is first accelerated with a=1.3 m/s$^2$ and then decelerated (solid line in FIG. 2a), the maximum necessary torque for the backrest adjustment is reduced to approximately 650 Nm (solid line in FIG. 2b), since the deceleration of the seat length adjustment achieves an inertia moment of the seat backrest and passenger which significantly reduces the maximum power requirement during this deceleration. The retaining moment for the backrest at Δt=0.0-0.5 s is significantly greater (approximately 650 Nm) during the acceleration of the seat length movement than without the seat length adjustment. However, because of the control strategy, due to later actuation of the drive of the backrest slope adjustment (at the time of deceleration of the seat length adjustment), the latter may be executed with a lower maximum necessary power than if both drives for both adjustment levels were started simultaneously.

It is pointed out that with respect to the exemplary embodiments shown in the figures and in the description, many possible combinations of individual features are possible. Thus for example, individual method steps may be omitted or their sequence modified. For input data, different sensors may be used or data may be previously stored in the control unit. The matching of the number of adjustment levels and the concrete actuation strategy may be adapted to the respective seat and crash event. As electrical drives, preferably electric motors with a following gear mechanism are used, wherein different gear designs such as worm gears, eccentric gears, or cylindrical or bevel gears may be used. The control unit may be configured as a central control unit for several electric motors, or be integrated in a control unit of a drive, or be configured as a component of the pre-crash controller. Also, the method may be used for applications outside a pre-crash case, for example for rapid adjustment of the seat components as an entry/exit aid or for other comfort uses in the motor vehicle.

The invention claimed is:

1. A method for operating electrical drive units of seat components of a vehicle seat in a motor vehicle during a detected pre-crash situation, the method comprising:
   depending on an actual position of a passenger, moving the passenger to a target position for an impending crash case based on a control strategy, and
   determining the control strategy for coordinating an adjustment of the seat components in order to actuate at least two of the electrical drive units simultaneously or immediately successively such that a required power of the electrical drive units is minimized, wherein the control strategy adjusts the seat components based on a state of charge of an energy storage device for the electrical drive units, wherein the adjustment of the seat components accelerates the vehicle seat in a direction of travel of the motor vehicle and then decelerates the vehicle seat again, and wherein the adjustment of the seat components includes a backrest slope adjustment overlapping with the process of decelerating the vehicle seat.

2. The method as claimed in claim 1, wherein the control strategy for coordinating the adjustment of the seat components is determined as a function of sensor signals from pre-crash sensors in the motor vehicle which estimate time and acceleration values of the vehicle in all directions until the crash.

3. The method as claimed in claim 1, wherein the control strategy for coordinating the adjustment of the seat components is determined as a function of detected positional data of the seat components, detected key values of the passenger, or both.

4. The method as claimed in claim 1, wherein the control strategy for coordinating the adjustment of the seat components is determined as a function of detected key values of the passenger selected from the group consisting of, body mass, and consciousness state.

5. The method as claimed in claim 1, wherein the control strategy for coordinating the adjustment of the seat components is determined as a function of an available maximum performance capacity of an assigned battery, an accumulator, or a supercapacitor.

6. The method as claimed in claim 1, wherein the control strategy for coordinating the adjustment of the seat components takes into account an estimated interaction of movements of the various seat components.

7. The method as claimed in claim 1, wherein the control strategy for coordinating the adjustment of the seat components takes into account a maximum permitted acceleration load on different body parts of the passenger.

8. The method as claimed in claim 1, wherein the control strategy for coordinating the adjustment of the seat components actuates at least two adjustment levels of the seat components, selected from a group consisting of a seat longitudinal setting, a seat slope setting, and a backrest slope setting.

9. The method as claimed in claim 1, wherein the control strategy for coordinating the adjustment of the seat components actuates at least one adjustment level of the seat components, selected from a group consisting of a seat height setting, a headrest height setting, a leg support setting.

10. The method as claimed in claim 1, wherein the electrical drive units seat components are operated with a 24V or 36V or 48V or 60V vehicle network, and execute adjustment movements until the crash in a time period from 0.1 to 0.3 seconds.

11. The method as claimed in claim 1, wherein the control strategy, simultaneously with the erection of the backrest via the backrest slope adjustment, performs a seat slope adjustment in an opposite direction to the backrest slope adjustment in order to reduce the maximum necessary power of the electrical drive units.

12. The method as claimed in claim 11, wherein the control strategy matches the erection of the backrest and/or the seat slope to the deceleration of the vehicle on the basis of the pre-crash sensors, in order to reduce the maximum necessary power of the electrical drive unit of the backrest slope adjustment.

13. The method as claimed in claim 1, wherein the electrical drive units are configured for optimized efficiency and comprise self-braking gear mechanisms, and each comprise a clamping lock for fixing the seat components in a desired position.

14. A system for performing the method as claimed in claim 1, wherein the system comprises pre-crash sensors, position sensors for the seat components, sensors for detecting the passenger position, or a combination of the foregoing and the sensor data are processed in a control unit of the system in order to determine a control strategy, according to which the individual seat components are actuated by means of electrical drive units in a pre-crash case such that the required power of the drive units is minimized.

15. A method for operating electrical drive units of seat components in a motor vehicle during a detected pre-crash situation, the method comprising:
depending on an actual position of a passenger, moving the passenger to a target position for an impending crash case, and
determining a control strategy for coordinating an adjustment of the seat components in order to actuate at least two of the electrical drive units simultaneously or immediately successively such that a required power of the electrical drive units is minimized, wherein the control strategy accelerates a vehicle seat along a seat longitudinal adjustment in a direction of travel and then decelerates the vehicle seat again, wherein the process of decelerating the vehicle seat reduces a maximum necessary power for erection of a seat backrest via a backrest slope adjustment, which is performed simultaneously with the process of decelerating the vehicle seat.

16. The method as claimed in claim 1, wherein the control strategy for coordinating the adjustment of the seat components is based on a performance capacity of the electrical drive units.

17. A method for operating electrical drive units of seat components of a vehicle seat in a motor vehicle during a detected pre-crash situation, the method comprising:
depending on an actual position of a passenger, moving the passenger to a target position for an impending crash case based on a control strategy, and
determining the control strategy for coordinating an adjustment of the seat components in order to actuate at least two of the electrical drive units simultaneously or immediately successively such that a required power of the electrical drive units is minimized, wherein the control strategy accelerates the vehicle seat along a seat longitudinal adjustment in a direction of travel and then decelerates the vehicle seat again, wherein the process of decelerating the vehicle seat reduces a maximum necessary power for erection of a seat backrest via the backrest slope adjustment, wherein the backrest slope adjustment overlaps with the process of decelerating the vehicle seat.

* * * * *